United States Patent [19]

Blake

[11] 4,084,378
[45] Apr. 18, 1978

[54] WASTE GATE CONTROL FOR SUPERCHARGED ENGINES

[76] Inventor: William J. Blake, Rte. 1, Box 403, Muskogee, Okla. 74401

[21] Appl. No.: 719,882

[22] Filed: Sep. 1, 1976

[51] Int. Cl.² .............................................. F03B 23/00
[52] U.S. Cl. .................................... 60/602; 137/505.47
[58] Field of Search ................. 60/600, 602, 605, 611, 60/603; 137/505.47, 340; 251/61, 63.4

[56] References Cited

U.S. PATENT DOCUMENTS

| | | | |
|---|---|---|---|
| 2,619,983 | 12/1952 | Roberts | 137/505.47 |
| 2,667,898 | 2/1954 | Eichmann | 251/61 |
| 3,035,408 | 5/1962 | Silver | 60/602 |
| 3,386,465 | 6/1968 | Johnson | 137/505.47 |

FOREIGN PATENT DOCUMENTS 2,362,133  6/1975  Germany ............................. 60/602

Primary Examiner—Carlton R. Croyle
Assistant Examiner—L. J. Casaregola
Attorney, Agent, or Firm—Robert K. Rhea

[57] ABSTRACT

A waste gate for an internal combustion engine having an exhaust gas driven supercharger supplying air under pressure to the engine intake manifold which is sensitive to the intake manifold pressure and reduces the quantity of air supplied to the intake manifold by the supercharger when the pressure in the intake manifold attains a predetermined value for efficient use of fuel supplied to the engine and increasing its power output.

4 Claims, 6 Drawing Figures

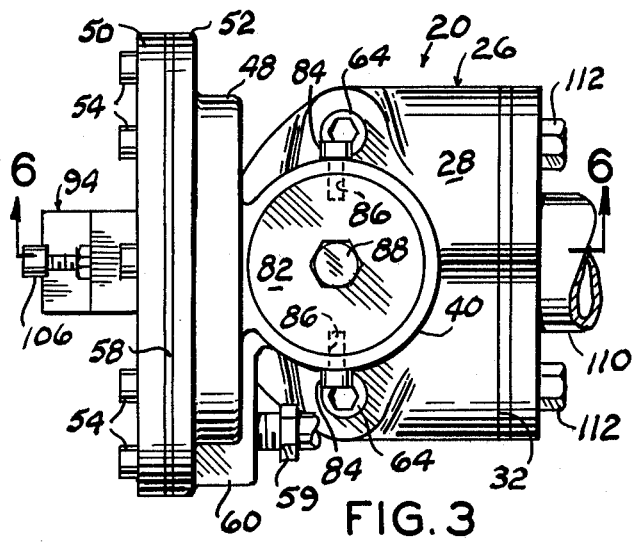
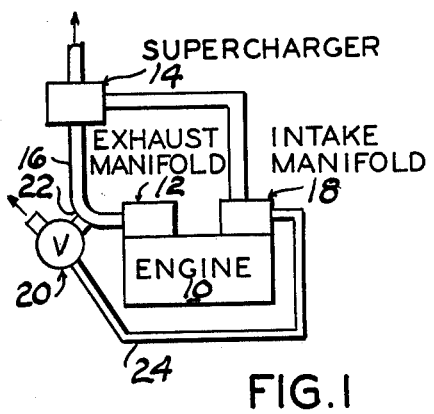
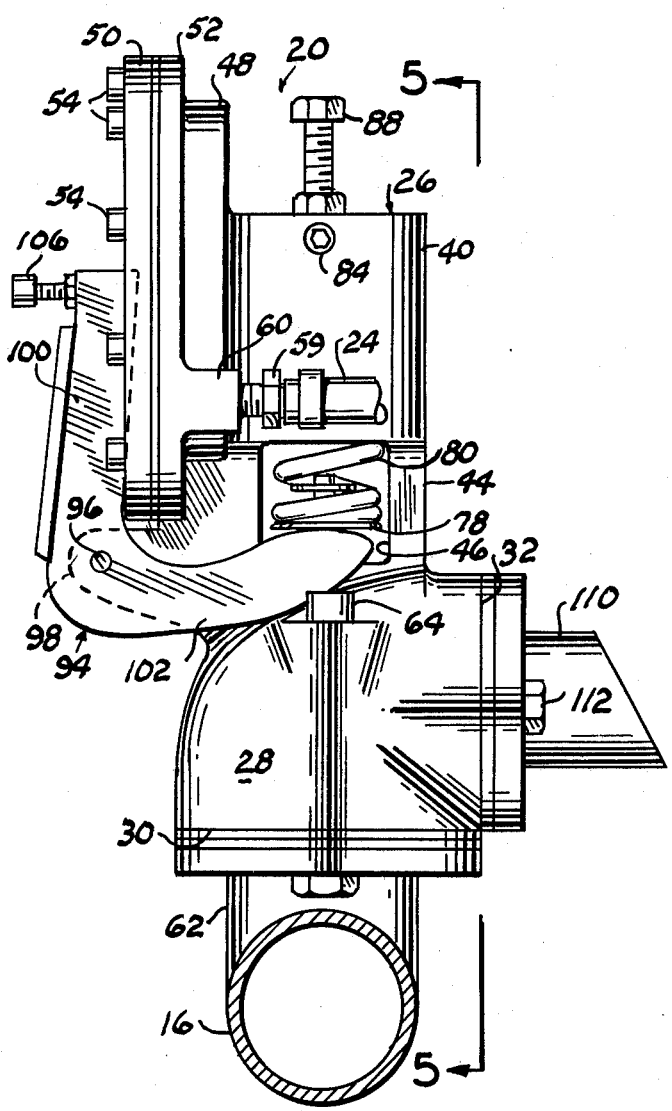
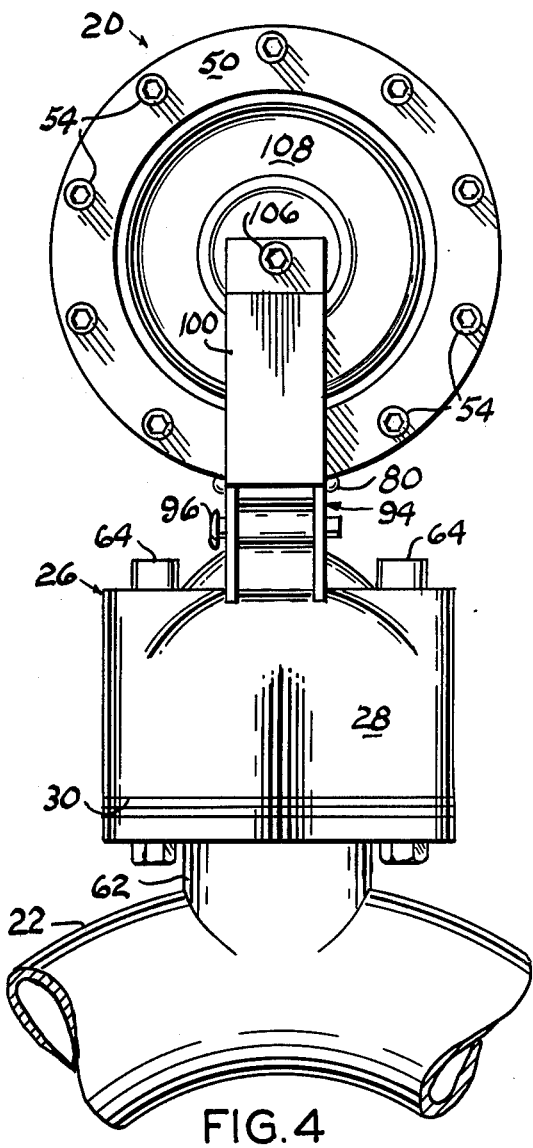
FIG. 1
FIG. 3
FIG. 2
FIG. 4

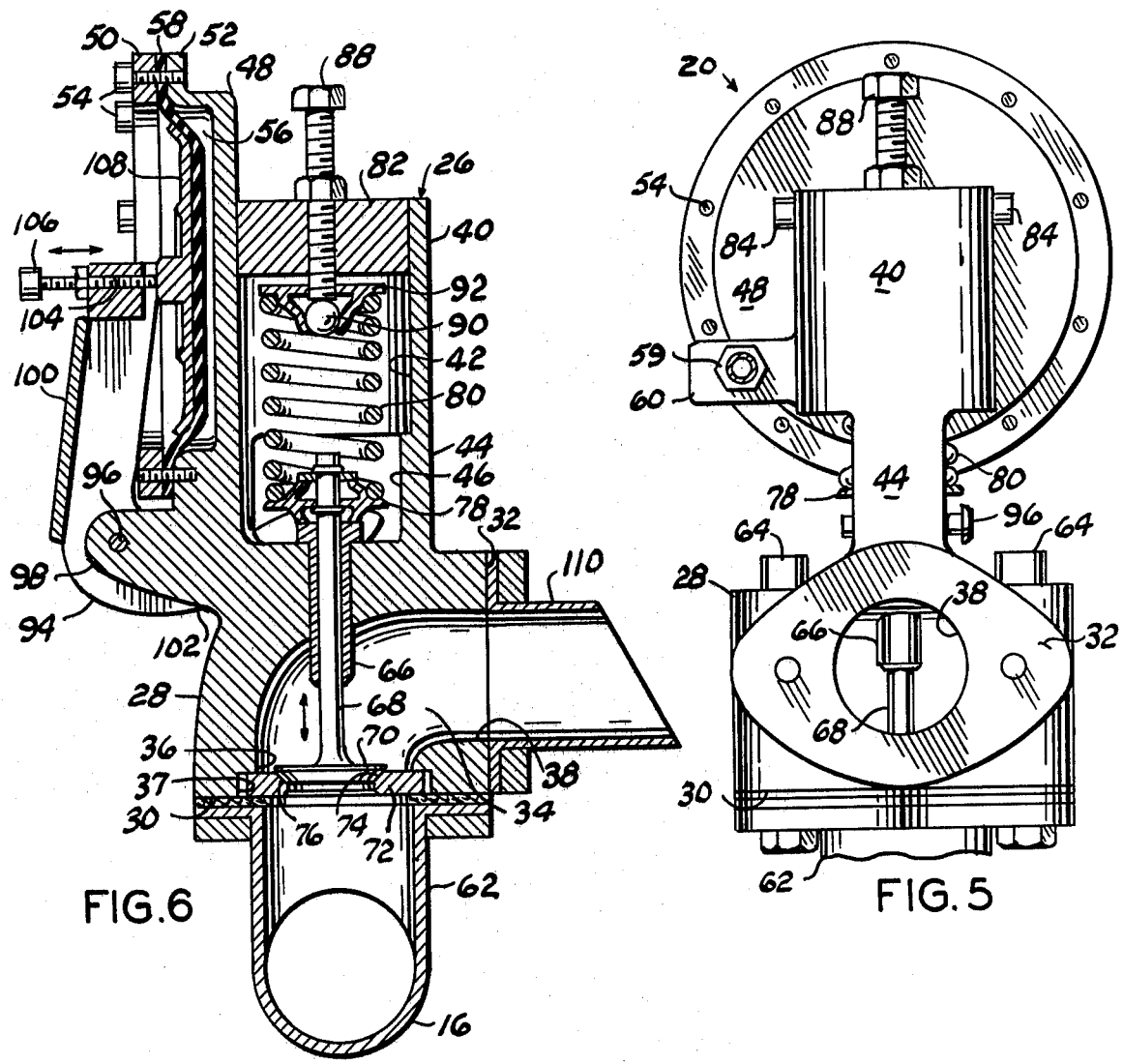

WASTE GATE CONTROL FOR SUPERCHARGED ENGINES

BACKGROUND OF THE INVENTION

1. Field of the Invention

The present invention relates to internal combustion engines equipped with a supercharger for supplying air under pressure to the intake manifold and more particularly to a waste gate communicating with the engine exhaust gases and responsive to intake manifold pressure for preventing excess intake manifold pressure above a desired maximum.

In a supercharged gasolene engine, such as used on automobiles and motorcycles, the supercharger will usually include a compressor impeller on one end of a shaft with a radial inward flow turbine wheel at the other end. Air fuel mixture enters the compressor and is compressed and passed to the engine intake manifold and then to the combustion chambers. When the exhaust gases leave the combustion chambers and flow through the exhaust manifold and exhaust pipe they are increased to a considerably higher volume and temperature and rotate the turbine wheel for operating the compressor. The greater volume of gas passing through the turbine wheel than through the compressor results in useful work obtained from the system and the air fuel mixture being passed into the cylinders at a pressure higher than atmospheric. Thus, more pounds of air can be delivered to the engine as compared to one which is naturally aspirated resulting in greater efficiency of fuel burned and greater power obtained from the engine. However, at higher engine speeds a supercharger will supply excessive higher temperature air fuel mixture to the intake manifold resulting in higher exhaust back pressure which reduces fuel economy without increasing engine power output.

This invention prevents the intake manifold pressure exceeding a predetermined value by venting excess exhaust gas back pressure, above a desired maximum, upstream with respect to the supercharger.

2. Description of the Prior Art

Prior patents, such as U.S. Pat. Nos. 3,035,408 and 3,365,878, generally disclose waste gate controls which feature a perforated diaphragm connected with and opening and closing a valve to release or contain exhaust gas pressure driving a supercharger.

The principal disadvantage of this type waste gate control is the perforated diaphragm which has a relatively short life when compared with an imperforate diaphragm and further the control apparatus is bulky and for this reason is objectionable when attached to a relatively small engine, such as a motorcycle.

This invention provides a waste gate which features an imperforate diaphragm arranged in a plane parallel with the stem of the valve controlling exhaust gas pressure and has an overall low profile and when attached to a small engine, such as a motorcycle, does not materially increase the overall dimensions thereof.

SUMMARY OF THE INVENTION

A valve housing is provided with an inlet port communicating with an exhaust port with the inlet port being adapted to be connected with an internal combustion engine exhaust pipe. The inlet port is opened and closed by a valve having a stem slidable in the housing and normally spring urged to a valve closed position. A pressure sensitive chamber, formed in the housing, is normally exhausted by an imperforate diaphragm normally urged toward a pressure chamber exhausted position by a bell crank pivotally connected with the housing and biased toward the diaphragm by the valve closing spring. The pressure chamber is connected by tubing with the engine intake manifold for biasing the diaphragm outwardly of the pressure sensitive chamber and opening the inlet port closing valve against its spring pressure when the engine intake manifold pressure attains a predetermined limit.

The principal objects of this invention are to provide a waste gate, for a motorcycle, or the like, having a side mounted diaphragm describing a minimum silhouette area with a diaphragm operated lever opening a waste gate gas exhaust valve, normally seated on a floating valve seat, against valve spring pressure in response to the diaphragm being pushed in one direction by intake manifold pressure which by the lever generates a pushing action on the valve and in which at least a portion of the valve stem and spring is exposed to ambient air streams for cooling.

BRIEF DESCRIPTION OF THE DRAWINGS

FIG. 1 is a diagrammatic view;

FIG. 2 is a side elevational view of the waste gate connected with a fragment of an exhaust pipe;

FIG. 3 is a top view of FIG. 2;

FIG. 4 is a left side view of FIG. 2;

FIG. 5 is a right side view of FIG. 2 looking in the direction of the arrows 5—5 of FIG. 2; and, FIG. 6 is a vertical cross sectional view taken substantially along the line 6—6 of FIG. 3.

DESCRIPTION OF THE PREFERRED EMBODIMENTS

Like characters of reference designate like parts in those figures of the drawings in which they occur.

In the drawings:

The reference numeral 10 indicates an internal combustion engine having an exhaust manifold 12 connected with a supercharger 14 by an exhaust pipe 16. The output of the supercharger 14 is connected with the engine intake manifold 18. The waste gate, indicated generally at 20, is preferably connected with the exhaust pipe 16 on the outside of a curve or bend 22 in the exhaust pipe for the reasons presently explained. The waste gate 20 is connected with the intake manifold by a tube 24 for opening and closing a valve in the waste gate in the manner presently explained.

The numeral 26 indicates a waste gate housing having a generally elbow-shaped base portion 28 having flat faces 30 and 32 arranged in right angular relation and provided with an elbow-shaped gas passageway 34 forming an inlet port 36 open through the face 30 and an outlet port 38 open through the face 32. The inlet port is counterbored, as at 37, for the reason presently apparent. The housing 26 further includes a cylindrical portion 40 having a bore 42 formed on an axis coaxial with the inlet port 36 with the cylindrical portion 40 being secured to the base 28 by a web portion 44 having a transverse aperture 46 open to opposing sides of the web and communicating with the adjacent end of the cylindrical bore 42. The housing 26 further includes a generally dish-shaped diaphragm supporting plate 48 integrally joined with the cylindrical portion 40 and lying in a plane parallel with and diametrically opposite the base face 32. A ring member 50 is flatly secured to an outstanding flange 52 formed on the diaphragm plate 48 by screws 54. An imperforate diaphragm 58 is interposed between the ring 50 and flange 52 to complete a pressure sensitive chamber 56.

A tubular hose fitting 59 is threadedly connected with a boss 60 formed on a peripheral portion of the diaphragm plate 48 and communicates with the pressure chamber 56 through a bore, not shown, formed in the boss 60. The tube 24 is connected with the fitting 59 in a conventional manner.

The base face 30 is connected with a fitting 62 by bolts and nuts 64 extending through the base 28 outwardly of the elbow-shaped passageway 34. The fitting 62 is interposed in the exhaust pipe on the outside curved surface of the exhaust pipe curve 22 so that maximum exhaust gas flow is directed into the fitting 62 for selective release, as presently explained.

The housing base 28 is drilled coaxial with the axis of the cylinder bore 42 for receiving a valve stem guide bushing 66 which extends into the passageway 34 from the transverse opening 46. The bushing 66 slidably receives the stem 68 of a valve having its head 70 substantially coaxially disposed within the inlet port 36. A washer 72, having a valve seat 74, is loosely disposed within the inlet port counterbore 37 for cooperative mating with the valve seat 76. The loose fit of the washer 72 within the counterbore 37 permits the valve head 70 to center the washer coaxial with the axis of the valve stem to insure contiguous contact of the seats 74 and 76 and closing of the inlet port 36. A valve cap 78 is secured in a substantially conventional manner to the end of the valve stem opposite its head. A valve loading spring 80 bears against the valve cap 78 at one end and coaxially extends at its other end into the cylindrical bore 42. A plug 82 is coaxially received by the cylindrical bore 42 at its end opposite the valve and is held in place by set screws 84 extending through the wall of the cylinder portion 26 and into diametrically opposite sockets 86 formed in the plug 82. The plug 82 is coaxially bored and threaded for receiving a spring tension adjustment bolt 88 which contacts a thrust bearing, such as a ball bearing 90, contained by a valve spring cap 92.

A bell crank 94 is pivotally supported by a pin 96 extending transversely through a housing projection 98 for pivoting movement of the bell crank arms 100 and 102 about the axis of the pin 96. The crank arm 100 extends toward the axis of the diaphragm plate 48 and is provided with a threaded bore 104 which receives an adjusting screw 106 coaxially bearing against a disk 108 of smaller diameter than the diaphragm ring 50 which contiguously overlies and contacts the diaphragm 58. The other crank arm 102 underlies the valve cap 78 so that when the spring 80 biases the valve to a closed position the other crank arm 100 moves the diaphragm 58 toward the diaphragm plate 48 so that the chamber 56 is at a minimum capacity.

A tube-like exhaust fitting 110 is secured to the housing base face 32 by stud bolts 112 in a conventional manner for releasing exhaust gases, as presently explained. Obviously, the exhaust outlet port 38 and housing face 32 may be connected with an exhaust pipe communicating with a muffler, not shown, if desired.

OPERATION

In operation the waste gate 20 is connected with the fitting 62 and intake manifold tube 24, as described hereinabove. The valve spring 80 is normally under sufficient tension to maintain the valve head 70 seated thus closing the inlet port 36. The tension on the valve spring 80 is further adjusted by the adjusting bolt 88 in accordance with the fuel being used and operating characteristics of the engine. This is accomplished by listening to cylinder ignition while the engine is running and adjusting the valve spring tension so that when pressure builds up, beyond a desired maximum, in the engine intake manifold, at a selected speed of the engine, it is applied to the diaphragm chamber 56 thus biasing the diaphragm 58 and crank arm 100 outwardly from the plate 48. The crank arm 102 is then lifted against the valve stem cap 78 to compress the spring 80 and unseat the valve head 70 to release exhaust gas pressure through the passageway 34. Thereafter, at lower engine speeds, the valve head 70 remains seated.

Obviously the invention is susceptible to changes or alterations without defeating its practicability. Therefore, I do not wish to be confined to the preferred embodiment shown in the drawings and described herein.

I claim:

1. A waste gate for an internal combustion engine having an exhaust gas driven supercharger interposed in its exhaust gas pipe supplying air under pressure greater than atmospheric to the engine intake manifold, comprising:

a housing having a base portion provided with a passageway therethrough forming an inlet port and an outlet port,
said housing having a hollow cylindrical portion and having a transversely apertured web securing said cylindrical portion to said base in spaced-apart relation coaxial with the inlet port;
means connecting said base with the exhaust gas pipe upstream with respect to the location of said supercharger for exhaust gas communication with the passageway,
said base having a bore coaxial with the inlet port;
a valve having one end portion of its stem disposed between said base and said cylindrical portion and slidable intermediate its ends within the housing bore and having a head including a seat for opening and closing the passageway inlet port;
spring means supported by said cylindrical portion for normally biasing said valve to an inlet port closed position;
a substantially dish-shaped diaphragm support formed on said cylindrical portion;
a diaphragm overlying and secured by its marginal edge portion to the marginal edge portion of said support for forming a chamber remote from said valve and said spring means;
tubular means connecting the chamber with said intake manifold,
said diaphragm being movable in one direction in response to an increased intake manifold pressure; and,
lever means pivotally supported by said housing and operatively contacted by said spring means for normally biasing said diaphragm in an opposite direction in response to a decrease in intake manifold pressure.

2. The waste gate according to claim 1 in which said spring means includes:

valve stem cap means secured to the end portion of said valve stem opposite its head;
a plug closing the end of the cylindrical portion opposite said valve;
a spring interposed between said plug and said valve cap means; and, means including an adjusting bolt connected with said plug for increasing and decreasing the spring load on said valve.

3. The waste gate according to claim 2 in which said lever means includes:
    a bell crank having one of its arms biased by said valve stem cap means toward the base inlet port for biasing the outer arm of said bell crank against said diaphragm; and,
    an adjusting screw supported by said other arm and projecting toward said diaphragm for maintaining said diaphragm in a chamber exhausted position when said valve is in a closed position.

4. The waste gate according to claim 3 in which said base inlet port is counterbored and further including:
    a valve seating washer loosely received by the inlet port counterbore,
    said washer having a seat mating with the valve seat for coaxially aligning said washer with the axis of said valve.

* * * * *